Oct. 28, 1941. F. M. SHANAHAN 2,260,981
SEAT CONSTRUCTION
Filed July 29, 1938 2 Sheets-Sheet 1
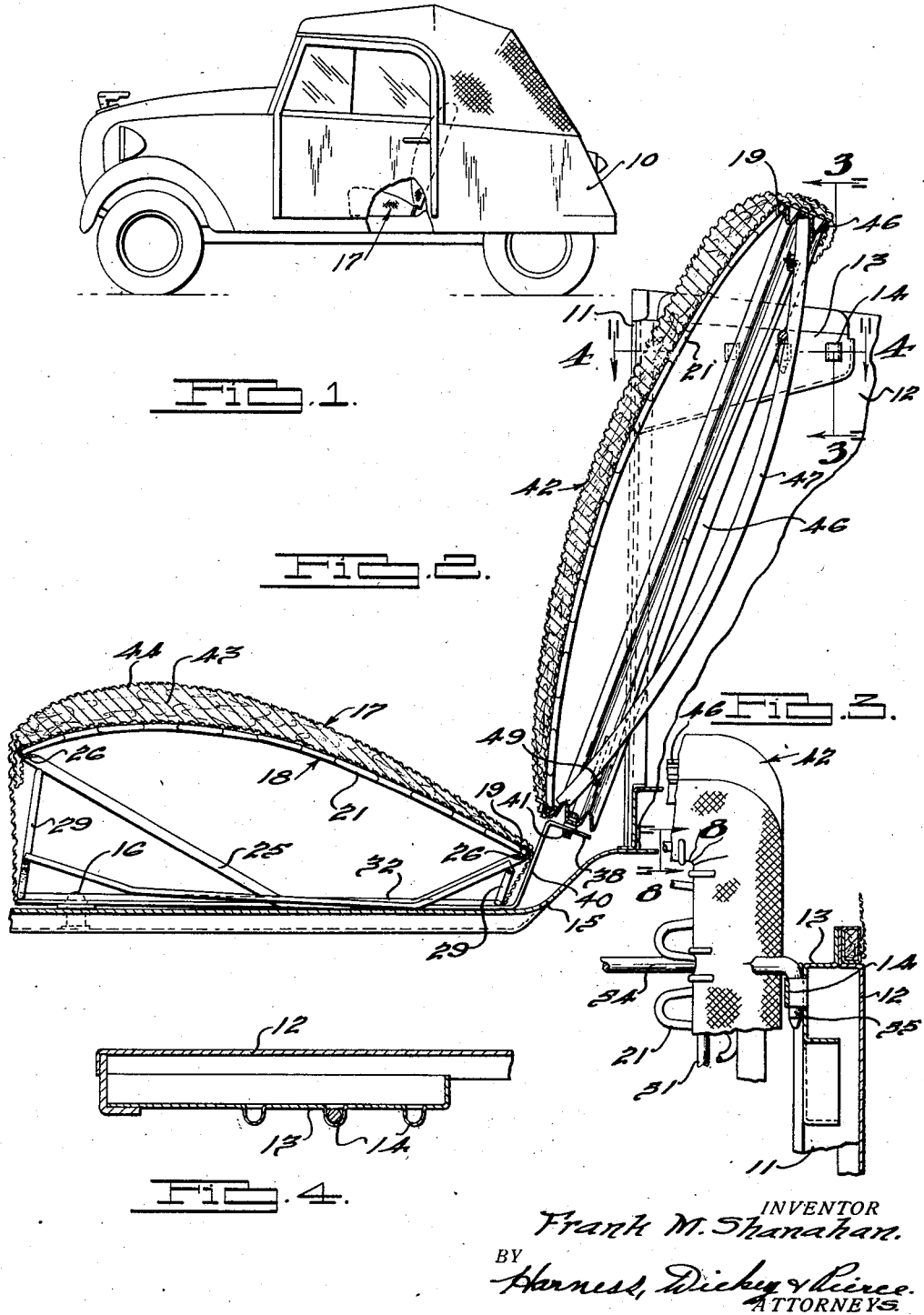

Oct. 28, 1941.     F. M. SHANAHAN     2,260,981
SEAT CONSTRUCTION
Filed July 29, 1938     2 Sheets-Sheet 2
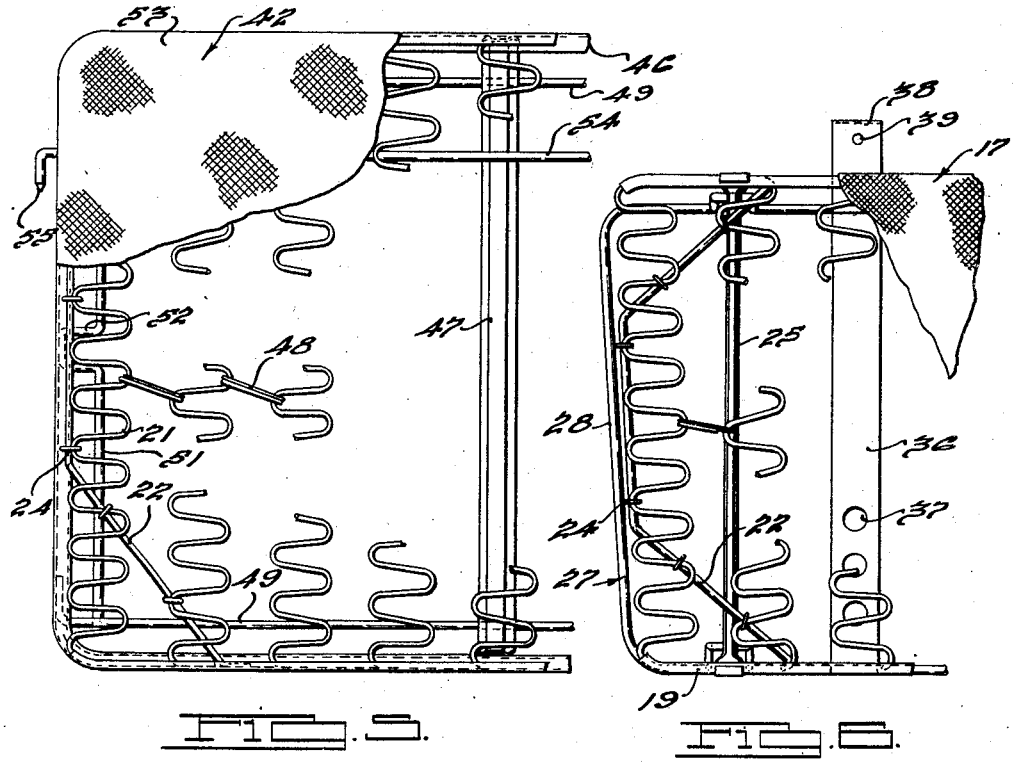
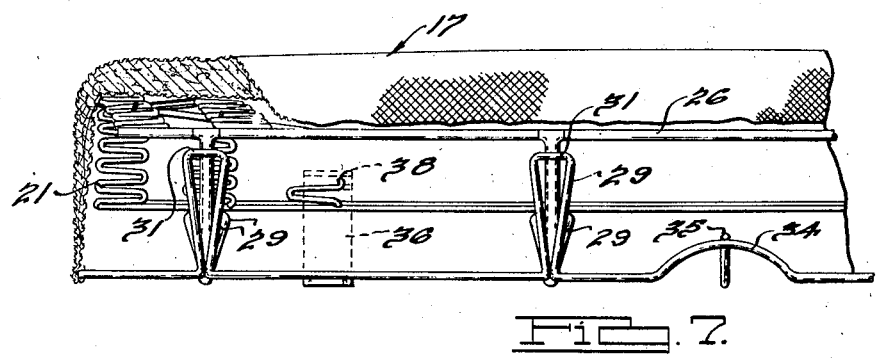
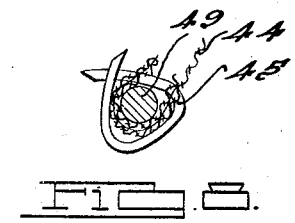
INVENTOR
Frank M. Shanahan.
BY
Harness, Dickey & Pierce
ATTORNEYS Patented Oct. 28, 1941

2,260,981

UNITED STATES PATENT OFFICE 2,260,981

SEAT CONSTRUCTION

Frank M. Shanahan, Detroit, Mich., assignor to The Murray Corporation of America, Detroit, Mich., a corporation of Delaware Application July 29, 1938, Serial No. 222,007

3 Claims. (Cl. 155—116)

This invention relates to seat constructions, and particularly to a seat for an automobile body which is new and novel in construction and provided with novel means of support and adjustment.

The seat cushion is a separate element somewhat similar in form to that illustrated and described in the co-pending application of Clarence H. Menge, Serial No. 155,273, filed July 23, 1937, which matured into Patent No. 2,178,670, issued November 7, 1939 and assigned to the assignee of the present invention. The cushion embodies a frame portion spanned by sinuous spring strips forming a spring surface. The frame is mounted on a sub-structure which is rigid, all of which is covered by pad and trim material. The back cushion is constructed from a frame of predetermined section, having supporting elements for the sinuous spring strips forming a spring surface which is covered by pad and trim material. The construction is such as to readily lend itself to the hog ringing of the trim material to the back and under side of the cushions.

A laterally disposed rod extends across the back cushion which has its ends bent downwardly beyond the side edges of the frame. The vehicle body is of unique construction, being illustrated, described and claimed in the co-pending application of C. W. Avery et al., Serial No. 222,413, filed August 1, 1938, and assigned to the assignee of the present invention. Gusset plates are employed between the rear pillar elements and the body panel which gusset plates are provided with vertical eyes through which the ends of the transverse rod on the back cushion extends. Means are also provided for adjustably positioning the seat longitudinally of the vehicle. By selecting the proper eyes, and by adjusting the seat longitudinally the desired tilt to the back cushion and/or the proper leg room is thereby provided.

Accordingly, the main objects of my invention are to provide a seat and back cushion for a vehicle body having a spring surface formed from sinuous spring elements which are attached to a supporting frame; to form a supporting element for a frame having a spring surface which is constructed from wire and reinforced by metal elements in which the frame is nested and secured; to form a frame for a back cushion from a sinuously formed strap and attach the spring strip receiving elements directly thereto or form such elements directly therein; to provide a frame of sinuous section for a back cushion having means thereon for engaging and securing spring strips across its opposite sides which are braced against the tension of said springs; to provide a back cushion frame with downwardly presented hooks which selectively engage eyes at the inner side of the body for adjusting the tilted position of the seat to a desired angle; and in general, to provide a seat and back cushion for a vehicle body which is simple in construction, readily adjustable, and economical of manufacture.

Other objects and features of novelty of my invention will be either specifically pointed out or will become apparent when referring, for a better understanding of my invention to the following description taken in conjunction with the accompanying drawings, wherein:

Figure 1 is a view in elevation, with parts broken away, of a vehicle body having a seat therein embodying features of my invention;

Fig. 2 is an enlarged sectional view of the seat and back cushion and portions of the vehicle body illustrated in Fig. 1;

Fig. 3 is an enlarged broken sectional view of the structure illustrated in Fig. 2, taken on the line 3—3 thereof;

Fig. 4 is an enlarged sectional view of the structure illustrated in Fig. 2, taken on the line 4—4 thereof;

Fig. 5 is a broken front view of the back cushion illustrated in Fig. 2;

Fig. 6 is a broken plan view of the seat cushion illustrated in Fig. 2;

Fig. 7 is a broken front view of the seat cushion illustrated in Fig. 2; and

Fig. 8 is an enlarged sectional view of the structure illustrated in Fig. 3, taken on the line 8—8 thereof.

The vehicle body 10, illustrated in Fig. 1, has the rear pillars 11 joined to the side panels 12 at the top with gusset plates 13, as described in the above mentioned co-pending application. Eyes 14, which are vertically disposed, are pressed out or otherwise formed or attached to the plates 13 to provide means for supporting the back cushion at various positions. A floor panel 15 is attached to the inner side sill portion of the body having spaced projecting lugs 16 over which the seat cushion 17 is disposed and retained in predetermined position.

The seat cushion 17 embodies a top frame 18 comprising front and rear border elements 19 interconnected by a plurality of sinuously formed springs 21 which are similar to those illustrated, described, and claimed in the patent to Kaden No. 2,002,399, under which the assignee is a licensee. The border element 19 follows the construction illustrated, described, and claimed in the co-pending application of C. H. Menge, Ser. No. 139,765, filed April 29, 1937, which issued as Patent No. 2,175,062, on November 3, 1939, assigned to the assignee of the present invention. The border elements have adjacent channel and recessed portions into the former of which the ends of the spring strips 21 may be disposed and moved axially into a recess to be anchored therein. The walls of the channel portion thereafter may be crimped together to prevent the reverse movement of the strip ends which thereby locks them firmly in position.

End bracing wires 22 may be attached to the outer spring strips 21, as illustrated in Fig. 6, to resist the movement of the strips laterally. The ends of the wires 22 are preferably anchored with recesses in the border elements 19. Hog rings 24 or other suitable means secure the wires 22 to the spring strips 21. Spaced supporting and bracing elements 25, of channel cross section, have arcuate ends 26 which receive the border elements 19 over which they are clamped to support the spring frame 18 with the elements 19 in a firm, rigid position.

A bottom frame 27 is formed of a wire 28 which is bent upwardly laterally and downwardly forming triangular supports 29 at spaced points. The supports 29 at the front of the cushion are of greater height than the supports 29 at the rear thereof. This provides the desired depth at the front edge of the cushion which is greater than at the rear edge. The laterally disposed portion 31 of the triangular supports 29 are welded to the elements 25 adjacent to their ends to form a unit supporting structure therewith. The wire frame 27 forms, with the horizontally disposed portion 32 of the strip 25, the base support for the cushion assembly.

The wire 28 has an arcuate portion 34 in the front and back edge centrally of the cushion. The front arcuate portion 34 provides clearance for the propeller housing tunnel disposed in the bottom panel 15. The rear arcuate portion 34 is employed to clear the fastening means on certain constructions when the end of the chassis frame is fastened to the central portion of the body panel 15. A bracing wire 35 extends across the cushion frame 27 secured to the central portion of the arcuate portions 34 provided therein.

A pair of straps 36 interconnect the longitudinal wire portions 28 of the frame 27, spaced inwardly from each of the ends. The straps are provided with a plurality of apertures 37 which permit the longitudinal adjustment of the seat cushion when selectively disposed over the projecting studs 16 in the floor panel 15. The straps are bent upwardly at 40 and rearwardly at 38 providing ledges provided with an aperture 39 in which studs 41 on the back cushion 42, projects to retain the back cushion in predetermined relation to the seat cushion 17. A pad 43 is placed upon the spring frame 18 and a cover material 44 is stretched thereover and over the base frame 27 to which it is secured by a plurality of hog rings 45, as illustrated in Fig. 8.

The back cushion has a border frame 46 sinuous in cross section to provide strength and which has formed therein or welded or otherwise secured thereto, anchoring elements 19 for the spring strips having spaced adjacent channel and recessed portions throughout its length. Spring strips 21 span the frame 46 in the same manner as the spring strips 21 spanned the elements 19 of the seat cushion 17. A plurality of arcuate braces 47 span the longitudinal sides of the frame 46 to prevent them from being deflected inwardly by the tension in the spring strip 21. The endmost continuous spring strip elements 21 are braced by wire elements 22, the ends of which are secured in the anchoring elements 19, the central portion being secured by hog rings 24 to the endmost spring strip 21.

A plurality of aligned clamping pins 48 interconnect the adjacent spring strips 21 to retain them in predetermined relation to each other. Longitudinally extending wires 49 are secured to the transverse portion of the frame 46 and to the bracing elements 47, inwardly of the longitudinal portions of the frame. Transverse wires 51 are welded or otherwise secured to the wires 49 and may be provided with a U-shaped portion 52 which engages the transverse portion of the border frame 46 to prevent the wire from being deflected. The wires 49 and 51 provide anchoring means for the pad and trim material 51 which is drawn over the frame 46 and the wires and secured thereto by hog rings 45, as illustrated in Fig. 8.

An additional wire 54 is secured to the transverse portion of the frame 46 and to the bracing elements 47, having the ends extending beyond the frame and bent downwardly to form hooks 55 which are securable in the eyes 14 provided on the plate 13 of the body. By selecting the proper eye for the hooks 55, a desirable tilt is provided to the back cushion. The spacing of the eyes 14 is substantially that of the spacing of the apertures 37 in the strap 36 to have the back cushion positioned at the desired angle when the back cushion and seat cushion are both shifted. The cushions formed in this manner are extremely durable while light and economical of manufacture.

The frame elements of both cushions support the strip which form the spring surface, the elements on the seat cushion being supported on the wire frame and channel cross braces while on the back cushion the elements are welded or formed directly in the back cushion frame. The cover material is secured to the frames by hog rings, being attached directly to the border frame of the seat cushion and to wires welded or otherwise secured to the back cushion inwardly of the edges. The seat cushion is provided with straps having a plurality of holes therein which selectively receive studs projecting from the floor panel of the body to position the cushion at various points longitudinally of the floor panel. Similarly, the back cushion is provided with hooks which engage eyes in the body to permit a similar adjustment of the seat back or an independent adjustment to provide a desirable tilt of the back cushion relative to the seat cushion.

While I have described and illustrated but a single embodiment of my invention, it will be apparent to those skilled in the art that various changes, omissions, additions, and substitutions may be made therein without departing from the spirit and scope of my invention, as set forth in the appended claims.

What is claimed is:

1. A vehicle body having on the floor thereof projecting studs and on the body portion vertically disposed eyes, a back cushion, a seat cushion, straps on the seat cushion having apertures therein engageable with said studs and having the ends projecting rearwardly of the cushion and provided with an aperture, said back cushion having projections engaging the apertures of said ends, and hooks extending laterally of the back cushion engageable with said eyes in said body.

2. A combination with a seat cushion and a back cushion, of a strap on the bottom of said seat cushion projecting rearwardly thereof and having an aperture therein, the back cushion being provided with a projection which extend into said aperture in the projecting end of the strap, hooks fixed to and extending laterally of the back cushion, a support for the back cushion and eyes on said support into which the hooks on the back cushion are selectively disposed.

3. In a vehicle body having eyes extending from the inner surface of the sides thereof, a seat cushion, a back cushion, a pair of straps extending across the transverse dimensions of said seat cushion and extending from the rear edge thereof, said extending portions having apertures therein, a back cushion having projections engageable with said apertures, and hooks projecting from the sides of said seat back engageable with the eyes on the body sides.

FRANK M. SHANAHAN.